F. L. WESTRUM.
AUTOMOBILE CONVERTIBLE BED.
APPLICATION FILED JUNE 8, 1920.

1,360,162.

Patented Nov. 23, 1920.
2 SHEETS—SHEET 1.

Inventor
F. L. Westrum
By Wilkinson & Giusta.
Attorneys.

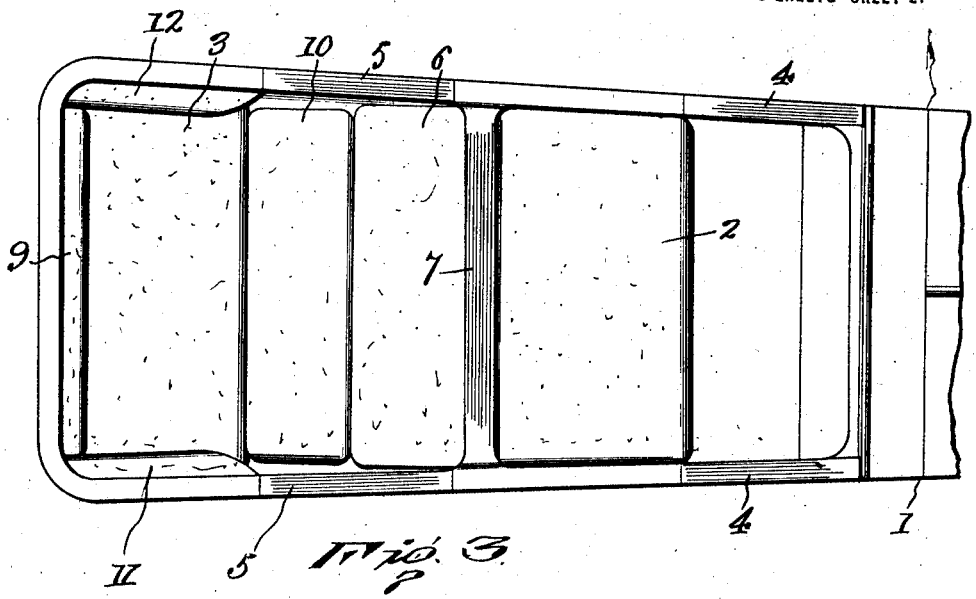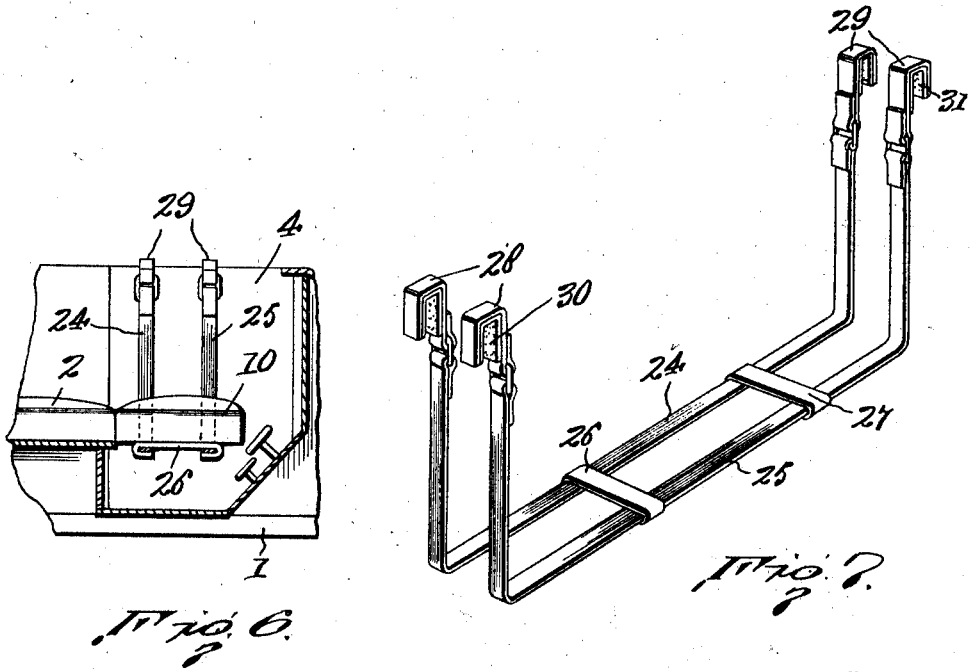

UNITED STATES PATENT OFFICE.

FREDRICK LEANDER WESTRUM, OF HINSDALE, MONTANA.

AUTOMOBILE CONVERTIBLE BED.

1,360,162.  Specification of Letters Patent.  Patented Nov. 23, 1920.

Application filed June 8, 1920. Serial No. 387,420.

*To all whom it may concern:*

Be it known that I, FREDRICK LEANDER WESTRUM, a citizen of the United States, residing at Hinsdale, in the county of Valley and State of Montana, have invented certain new and useful Improvements in Automobile Convertible Beds; and I do hereby declare the following to be a full, clear, and exact description of the invention, such as will enable others skilled in the art to which it appertains to make and use the same.

The present invention relates to automobile convertible beds, and has for an object to provide an improved construction of automobile seats in combination with certain additional parts required to hold the backs of the seats when removed and laid out horizontally in alinement with the seats to form therewith a bed.

Another object of the invention resides in providing a simple and inexpensive construction of automobile body and seats together with additional equipment for carrying out the above described purposes.

In the accompanying drawings forming a part of this application, and in which similar reference symbols indicate corresponding parts in the several views:

Fig. 3 is a top plan view of the same.

Fig. 6 is a fragmentary sectional view of the front portion of the automobile body showing a slight modification; and Fig. 7 is a perspective view showing the arrangement of tapes for holding the cushion forward of the front seat.

Figure 1:
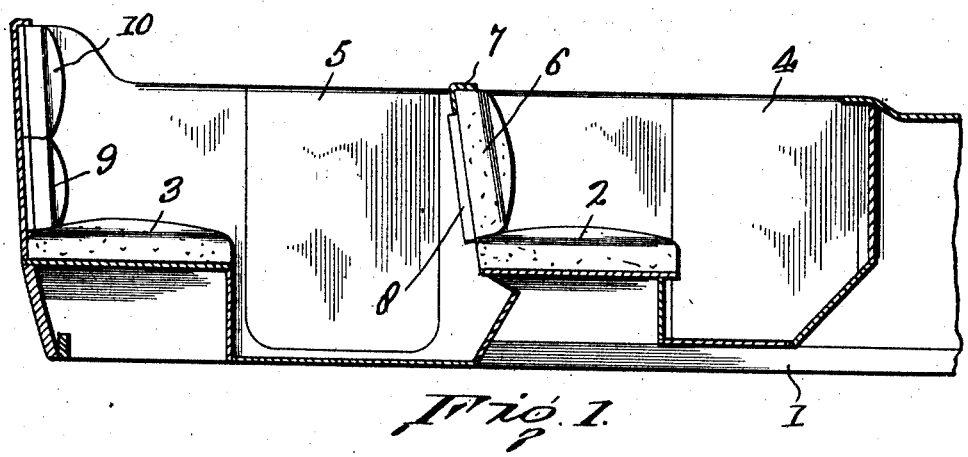
Figure 1 is a longitudinal central sectional view taken through an automobile equipped with seats having removable backs.
Figure 2:
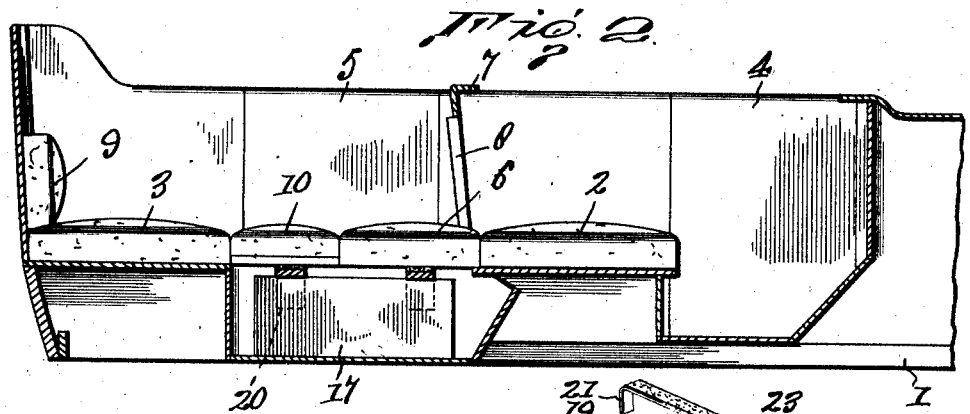
Fig. 2 is a similar view with the bed made up.
Figures 4, 5:
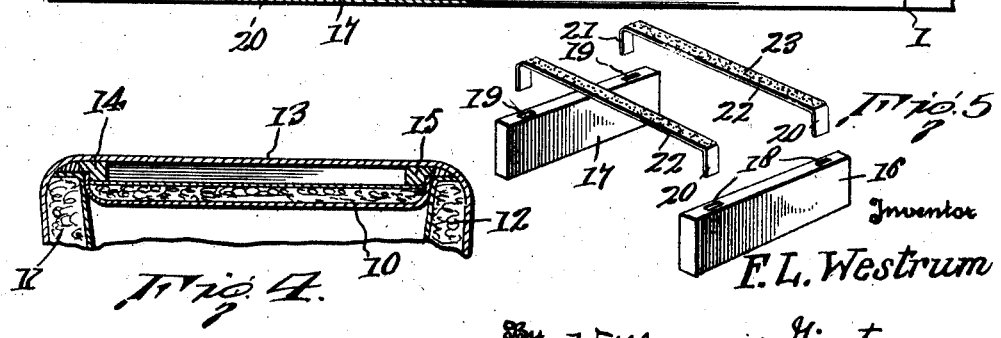
Fig. 4 is a sectional view through the back of the rear seat.
Fig. 5 is a perspective view, with the parts removed, of the frame for holding the back cushions when forming a bed.

Referring more particularly to the drawings, and for the present to Figs. 1 to 5 inclusive, 1 designates generally an automobile body having a front seat 2 and a rear seat 3 accessible, respectively, by the fore doors 4 and the rear doors 5. The front seat 2 is provided with a back cushion 6 normally set up in the position shown in Fig. 1, in which it coöperates with the seat 2 in the usual manner. The back cushion 6 is adapted to be removed from the position shown in Fig. 1 and laid in horizontal alinement with the seat 2 as indicated in Fig. 2, and for this purpose an angle brace 7 is secured to the sides of the vehicle body 1 in a position to receive the upper edge of the back cushion 6.

Strips 8, of wood, metal, or other suitable material, are fixed to the interior of the body in position to be engaged by the side edges of the back cushion 6, so as to support it in its erect position and prevent its being pushed rearweardly through the opening beneath the angle brace 7. Of course the back cushion 6 may be held in this position in any other appropriate manner.

The back seat 3 is provided with two back cushions 9 and 10; and of these cushions the lower cushion 9 is made stationary with the body while the upper cushion 10 is adapted to be removed so as to take a position in horizontal alinement with the seats and with the back cushion 6, as indicated in Fig. 2. The manner of making the upper back cushion 10 removable is preferably that shown in Fig. 4, in which the side cushions 11 and 12 terminate short of the rear 13 of the automobile body, providing spaces in which to receive flanges 14 and 15 which extend from the side edges of the back portion 10.

This construction enables the portion 10 to be removed by lifting it upwardly, the construction being such that the cushion will not be apt to jar loose during travel of the vehicle. Of course the lower cushion 9 could also be made removable if the space between the back and front seats is such as to require this additional cushion to fill the same. The back cushions 6 and 10 are supported on a suitable frame, preferably of the construction shown in Fig. 5.

According to this construction the frame is preferably composed of side rails 16 and 17 having rectangular openings 18 and 19 made in the upper edges thereof to receive the down turned ends 20 and 21 of a pair of supporting bars 22. The arrangement of these parts is such that the bars 22 may be lifted upwardly, whereupon their down turned ends 20 and 21 will be withdrawn from the openings 18 and 19, permitting of the quick disassembly of the frame so that it may be stored in some convenient place in the vehicle, such as beneath the back seat 3 or the front seat 2.

Strips of felt 23 are preferably secured to the upper faces of the bars 22 so as to avoid marring of the back cushions when they are laid upon the same, as indicated in Fig. 2.

When it is desired to convert the vehicle body from its ordinary condition, as illustrated in Fig. 1, into a bed, the frame comprising the rails 16 and 17 and the bars 22 is first set up and placed on the floor of the body between the front seat 2 and the rear seat 3. In case pedestal seats are used in this rear space the frame, of course, may be made of such a construction as to avoid interference with these seats after they are folded away. The back cushion 6 is removed from the brace 7 and strips 8 and is laid upon the forward bar 22, the bar being disposed at such a height as to hold the back cushion in alinement with the front seat 2.

In a similar manner the top back cushion 10 of the rear seat is lifted vertically so that its flanges 14 and 15 slide out from behind the seat cushions 11 and 12, and said top cushion 10 is thereupon placed upon the rear bar 22 of the frame at the side of the cushion 6. The cushions 6 and 10 will be of such a width as to completely fill up the space between the front and rear sides, thus making a continuous bed.

With vehicles having a shorter wheel base it is also desirable to have a cushion lie in front of the front side 2, as shown in Fig. 6. With vehicles of this character the space between the front and rear seats is such that it will be filled by the back cushion 6 alone, so that the cushion 10 may be supported in the manner shown in Fig. 6.

The apparatus for holding this cushion in the position just stated is preferably composed of tapes or strips 24 and 25 secured together by straps 26 and 27 intermediate their ends and at those portions which lie beneath the back cushion 10.

Pairs of clips 28 and 29 are secured to the ends of the tapes 24 and 25 and, as shown in Fig. 6, are adapted to be engaged over the upper edges of the fore doors 4. As indicated in Fig. 7, felt lining 30 and 31 is preferably placed in the clips 28 and 29 to prevent the metal from coming in contact with the doors and doing injury thereto.

It is obvious that those skilled in the art may vary the details of construction and arrangements of parts without departing from the spirit of my invention, and therefore I do not wish to be limited to such features except as may be required by the claims.

I claim:

1. In combination with an automobile body having a floor and front and rear seats, backs for said front and rear seats, the back for the front seat being removable, a portion of the back of the rear seat also being removable, said back and back portion adapted to be supported in alinement with the seats to provide a bed, a frame work for supporting said back between the front and rear seats, said frame work comprising a pair of bars adapted to freely rest upon the floor of the vehicle between the front and rear seats and having openings in their upper edges, cross-bars having down turned ends fitted in the openings in said first mentioned bars, said bars being demountable, and means for supporting said back portion forwardly of the front seat and in alinement therewith, said means comprising a pair of tapes, means for holding said tapes spaced apart, and hooks provided at the ends of the tapes for engagement with portions of the vehicle adapted to support the same, substantially as described.

2. In combination with a vehicle body having a floor and front and rear seats, a back for the front seat, an angle brace extended across the vehicle body above said back and adapted to allow removal of the back, a stationary lower back portion for the rear seat, an upper removable back portion for said rear seat slidable upwardly and removable from the vehicle body, a demountable frame adapted to rest freely on the floor of the body between the front and rear seats for holding said back of the front seat in alinement with said seats, and means for holding the removable back portion of the rear seat forwardly of the front seat and in alinement therewith, substantially as described.

3. In combination with a vehicle body having front and rear seats, an angle brace extending across the vehicle, strips extending vertically downward from said angle brace, a back for the front seat removably resting against said angle brace and said strips, a frame work freely resting upon the floor of the vehicle and movable about therein for holding the back of said front seat in alinement with the seats, said frame work composed of supporting bars and cross-bars removably carried thereby, the upper portion of the rear seat being removable, a pair of flexible tapes supported forwardly of the front seat for receiving and holding said removed upper back portion of the rear seat in alinement with such seats and hooks for suspending the tapes from the vehicle fore doors, substantially as described.

FREDRICK LEANDER WESTRUM.